United States Patent
Nigro et al.

(10) Patent No.: US 7,024,981 B2
(45) Date of Patent: Apr. 11, 2006

(54) WRIST PIN

(75) Inventors: Roberto B. Nigro, Ann Arbor, MI (US); Randall R. Gaiser, Chelsea, MI (US); Eduardo Matsuo, Ann Arbor, MI (US); Eric A. Highum, Howell, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 60 days.

(21) Appl. No.: 10/770,930

(22) Filed: Feb. 3, 2004

(65) Prior Publication Data

US 2004/0216605 A1 Nov. 4, 2004

Related U.S. Application Data

(60) Provisional application No. 60/444,421, filed on Feb. 3, 2003.

(51) Int. Cl.
*F16J 1/16* (2006.01)

(52) U.S. Cl. ......................................................... 92/187

(58) Field of Classification Search .................... 92/187
See application file for complete search history.

(56) References Cited

U.S. PATENT DOCUMENTS

| 4,124,010 A | 11/1978 | Fiedler |
| 4,189,932 A | 2/1980 | Fielder |
| 4,730,548 A | 3/1988 | Maeda et al. |
| 4,754,608 A | 7/1988 | Bertsch |
| 5,549,086 A | 8/1996 | Ozawa et al. |
| 5,836,280 A | 11/1998 | Miyazawa |
| 5,884,600 A | 3/1999 | Wang et al. |
| 5,893,609 A | 4/1999 | Schmidt |
| 6,513,477 B1 | 2/2003 | Gaiser et al. |
| 6,557,457 B1 | 5/2003 | Hart et al. ...................... 92/223 |
| 2002/0157534 A1 | 10/2002 | Schneider et al. |
| 2004/0215545 A1 | 10/2004 | Murakami et al. |

OTHER PUBLICATIONS

Metals Handbook Copyrighted 1998, pp. 910-913, Especially p. 912.
CRC Handbook of Mechanical Engineering Copyright 1998, pp. 11-78 to 11-80.

*Primary Examiner*—F. Daniel Lopez
(74) *Attorney, Agent, or Firm*—Dickinson Wright PLLC

(57) ABSTRACT

A wrist pin for a heavy-duty piston assembly has a body with an axis of rotation and a generally cylindrical outer surface. The outer surface is adapted for pivotal connection to both a pair of laterally spaced pin bores and a small end of a connecting rod generally between the pin bores. The outer surface has a surface roughness equal to or less than 0.10 µm. The outer surface has a Kurtosis value that is inversely proportional with the surface roughness such that a product of the Kurtosis value and the surface roughness is between about 0.30 µm to 0.60 µm. The outer surface has a skewness of about −1.0 to 0.0 and a lay angle relative to the axis of about 85 to 95 degrees.

5 Claims, 2 Drawing Sheets

WRIST PIN

This application claims priority to Provisional Patent Application No. 60/444,421, filed Feb. 3, 2003.

FIELD OF THE INVENTION

The invention relates generally to piston assemblies for heavy-duty diesel engine applications, and more particularly to wrist pins within the piston assemblies.

RELATED ART

Conventional piston assemblies for use in internal combustion engines, particularly heavy-duty diesel engines, generally comprise a crown or head portion which acts as a reaction surface for the combustion in the corresponding cylinder of the engine. A pair of laterally spaced pin bosses depend from the piston head and terminate in a pair of coaxial pin bores. A small end of a connecting rod is journaled at one of its ends about a wrist pin, and the wrist pin is journaled within the pin bores.

Typically, bushings are pressed into the pin bores and the small end of the connecting rod to provide a low friction running surface which reduces wear between the wrist pin and the journaled surfaces. The provision of bushings adds cost and complexity to the construction and manufacture of piston assemblies. It is an object of the present invention to eliminate the need for such bushings.

SUMMARY OF THE INVENTION

A wrist pin for a heavy-duty piston assembly has a body with an axis of rotation and a generally cylindrical outer surface. The outer surface is adapted for pivotal connection to both a pair of laterally spaced pin bores and a small end of a connecting rod arranged between the pin bores. The outer surface has a combination of defined characteristics that enable the pin to be utilized without the need for traditional bearings or bushings. According to the invention, the outer surface has a surface roughness equal to or less than 0.10 µm, a Kurtosis value that is inversely proportional with the surface roughness such that a product of the Kurtosis value and the surface roughness is between about 0.30 µm to 0.60 µm, a skewness of about −1.0 to 0.0 and a lay angle relative to the axis of about 85 to 95 degrees.

One advantage of the present invention is that the bushings typically used in the pin bores and the small end of the connecting rod can be eliminated.

Another advantage of the invention is that the total cost of a piston assembly can be reduced.

Another advantage of the invention is that it is of economical manufacture, and readily adaptable in current designs.

Another advantage of the invention is that the weight of the piston assembly is reduced.

Another advantage of the invention is that the resulting wear from abrasive contaminants to the bushings is eliminated.

BRIEF DESCRIPTION OF THE DRAWINGS

These and other features and advantages of the present invention will become more readily appreciated when considered in connection with the following detailed description and appended drawings, wherein.

DETAILED DESCRIPTION OF A PREFERRED EMBODIMENT

Figure 1:
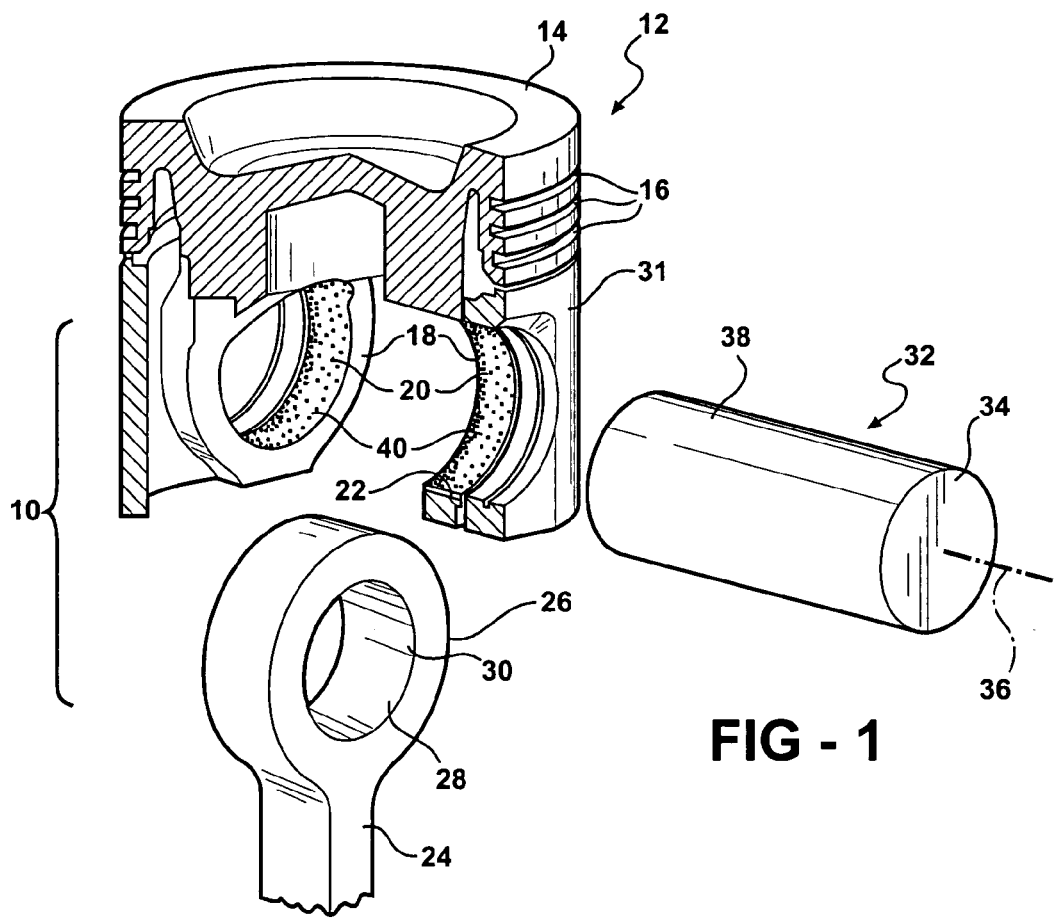
FIG. 1 is an exploded perspective view of a piston assembly constructed according to one embodiment of the invention.
Figure 2:
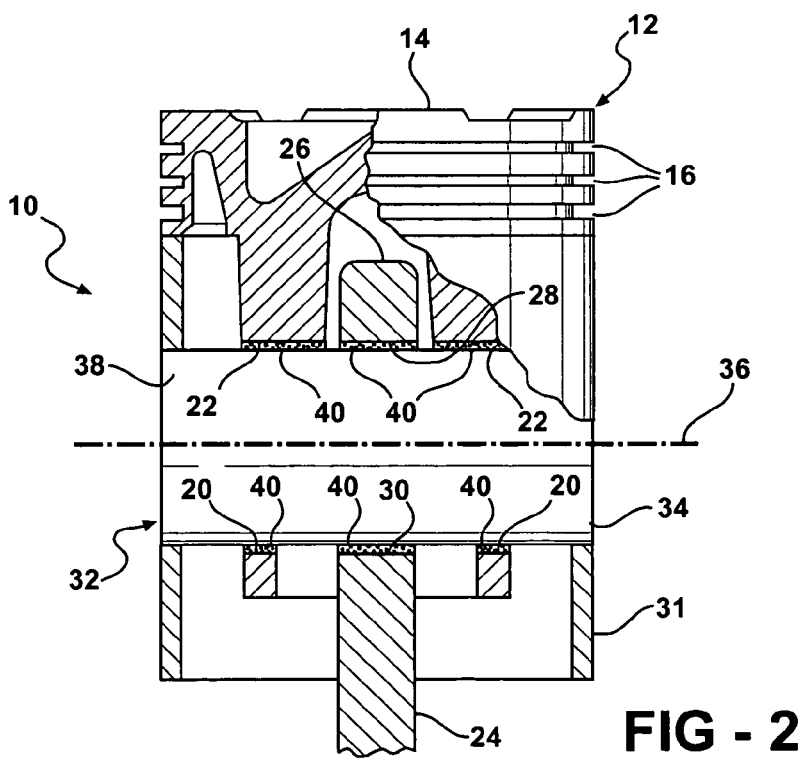
FIG. 2 is an enlarged fragmentary sectional view of the assembled components of FIG. 1.
Figure 3:
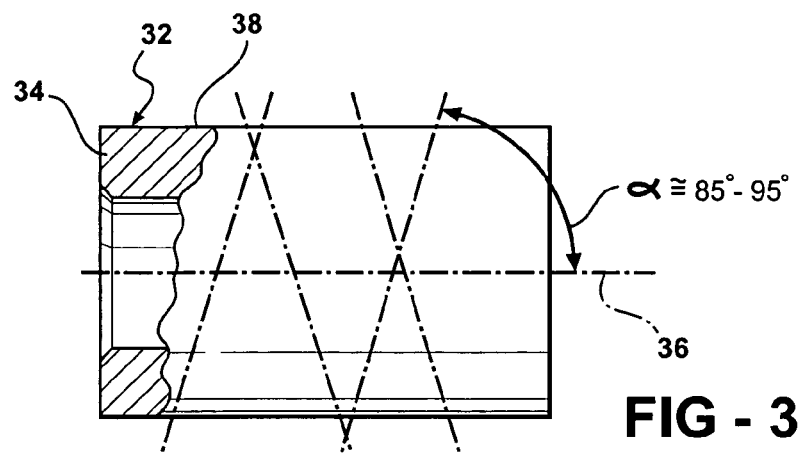
FIG. 3 is an enlarged partially sectional plan view of the wrist pin.

A piston assembly constructed according to one presently preferred embodiment of the invention is shown generally at 10 in FIGS. 1 and 2. The assembly has a piston body 12 (cast or forged) having an upper crown portion 14 formed with ring grooves 16 for the accommodation of rings (not shown). A pair of laterally spaced pin bosses 18 depend from the upper crown portion 14 and are formed with pin bores 20 having ground running surfaces 22 fabricated of a metallic material, preferably steel.

A connecting rod 24, preferably cast or forged from steel, has a small end 26 formed with a wrist pin bore 28 having a ground running surface 30 alignable with the pin bores 20 of the piston body 12, as shown in FIG. 2.

Figure 4:
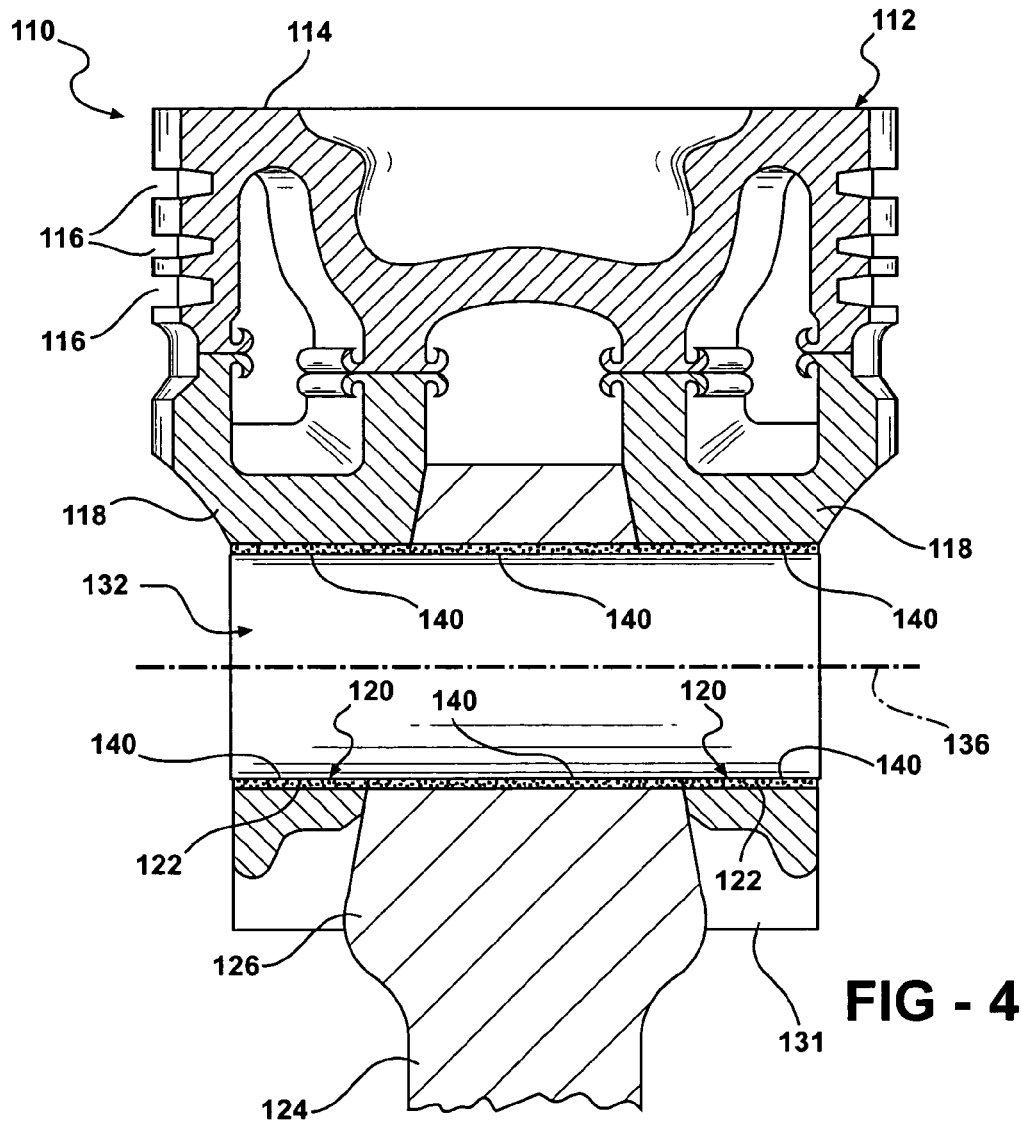
FIG. 4 is a sectional view showing an alternative piston construction.

A skirt 31 is provided, and may be formed separately from, the piston body 12 from a lightweight material such as aluminum and joined by the wrist pin 32 as shown to provide an articulated structure. Alternatively, the skirt 31 may be formed of one piece with the piston body of the same material in a monobloc construction, as depicted at 3 in FIG. 4, wherein the same reference numerals are used to represent like features, but are offset by 100.

A wrist pin 32 has a body 34 having an axis of rotation 36 and a generally cylindrical outer surface 38. The outer surface 38 is adapted for pivotal connection to the pin bores 20 of the piston body 12 and the wrist pin bore 28 in the small end 26 of the connecting rod 24.

The outer surface 38 of the wrist pin 32 is constructed for rotatable and/or pivotal connection to the pin bores 20 of the piston body 12 and the wrist pin bore 28 of the connecting rod 24 such that the need to incorporate bushings, as are commonly used, in the pin bores 20 and the wrist pin bore 28 is eliminated. Preferably, to reduce the friction between the outer surface 38 of the wrist pin 32 and the bores 20, 28, a manganese phosphate $MnP(OH)_2$ coating 40 is applied to the running surfaces 22 of the pin bores 20, and to the ground running surface 30 of the wrist pin bore 28. The manganese phosphate is engineered to provide at least in part the necessary tribological properties without having to incorporate the typical bushings within the bores 20, 28.

To inhibit damage from resulting between the outer surface 38 of the wrist pin 32 and the manganese coating 40 within the respective bores 20, 28, the outer surface 38 is produced having a surface roughness ($R_a$) with an arithmetic average deviation of 0.10 µm or less. The outer surface 38 also has a Kurtosis value that is inversely proportional to the surface roughness ($R_a$) such that a product of the surface roughness ($R_a$) and the Kurtosis value (K) represented mathematically as ($R_a \times K$) is between about 0.30 µm to 0.60 µm. In addition, the outer surface 38 has a skewness of about −1.0 to 0.0, and a lay angle a relative to the axis 36 of about 85 to 95 degrees. Preferably, the outer surface 38 has a hardness of about 60 (HRC) or greater.

Skewness (Sk) can either take on a negative or a positive value. If the skewness is negative, this represents that a larger number of local maxima are above the mean as compared to a Gaussian distribution, which has a skewness value of zero. For a positive skewness, the converse is true, wherein a larger number of local maxima are below the mean as compared to that of a Gaussian distribution.

Similarly, a surface with a low Kurtosis has a larger number of local maxima above the mean as compared to that of a Gaussian distribution, and a surface with a high Kurtosis has a larger number of local maxima below the mean as compared to that of a Gaussian distribution.

The surface topography is preferably analyzed using a white light interferometry (WRI) method. In using (WRI), the calculations are based on a square area analysis. As such, rather than obtaining values based simply on a linear reading, as is commonly known, a more representative reading is obtained by taking into account a broader spectrum of the outer surface 38.

It should be recognized that in obtaining the specified parameters for the various characteristics of the outer surface 38 outlined above, that the need for bushings in either or both the pin bores 20 and the wrist pin bore 28 may be eliminated. However, if desired, a bushing may be used in either or both bores 20, 28. If bushings are used, then the useful life of the bushings is enhanced by reducing the amount of scuffing and/or wear to the bushing.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A piston assembly, comprising:
   a piston having a wrist pin bore;
   a connecting rod having a wrist pin bore; and
   a wrist pin receivable in said bores to connect said piston to said connecting rod, said wrist pin having an outer surface roughness no greater than 0.10 μm, a Kurtosis value that is inversely proportional to said surface roughness such that the product of said Kurtosis value and said surface roughness is between about 0.3 μm to 0.6 μm, a skewness of about −1.0 to 0.0, and a lay angle relative to an axis of said wrist pin of 85 to 95 degrees.

2. The piston assembly of claim 1, wherein said wrist pin bores are bushingless and covered by a low friction coating.

3. The piston assembly of claim 2, wherein said low friction coating comprises manganese phosphate.

4. The piston assembly of claim 1, wherein said piston includes a piston body formed with said wrist pin bore and a piston skirt formed as one piece with said piston body of the same material.

5. A wrist pin for joining a connecting rod to a piston, said wrist pin comprising:
   a generally cylindrical wrist pin body having a central longitudinal axis and a outer surface; and
   wherein said outer surface is characterized by having an outer surface roughness of no greater than 0.10 μm, a Kurtosis value that is inversely proportional to the surface roughness such that the product of the Kurtosis valve and the surface roughness is between 0.3 μm and 0.60 μm, a skewness of about −1.0 to 0.0 and a lay angle relative to the axis of rotation of about 85 to 95 degrees.

* * * * *